United States Patent [19]

Smith et al.

[11] 4,327,631
[45] May 4, 1982

[54] LAUTERING APPARATUS

[75] Inventors: David K. Smith, Leven; Nigel Harlow, Cupar; Samuel W. Maxfield; James Mitchell, both of Leven, all of Scotland

[73] Assignee: Henry Balfour & Co., Leven, Scotland

[21] Appl. No.: 188,175

[22] Filed: Sep. 17, 1980

[30] Foreign Application Priority Data

Oct. 25, 1979 [GB] United Kingdom ............... 36994/79
Nov. 27, 1979 [GB] United Kingdom ............... 40903/79

[51] Int. Cl.³ .............................................. C12G 1/00
[52] U.S. Cl. .................... 99/277.2; 435/316; 366/311
[58] Field of Search .................... 99/277.2, 277.1, 277, 99/276, 278; 435/315, 316; 366/309, 311, 312, 313

[56] References Cited

U.S. PATENT DOCUMENTS 3,452,669 7/1969 Schaus ................................. 99/276
3,547,413 12/1970 Nunlist .............................. 99/277.2
3,589,270 6/1971 Schlimme .......................... 99/277.2
3,988,011 10/1976 Kressin ................................. 99/462
4,091,457 5/1978 Slywka ................................ 366/309

FOREIGN PATENT DOCUMENTS 1449037 9/1976 United Kingdom .
1537336 12/1978 United Kingdom .
1538620 1/1979 United Kingdom .

Primary Examiner—Robert W. Jenkins
Attorney, Agent, or Firm—Theodore B. Roessel; Roger Aceto

[57] ABSTRACT

A rotary lautering machine is provided vertical blades, each blade having a pivotally attached sweeping foot. The sweeping feet are rotated from a first lautering position to a second sweeping position by pressure exerted on the feet by material in the lautering vessel. When the lautering machine rotates in one direction, the feet pivot to the lautering position. When the machine rotates in the opposite direction, the feet pivot to the sweeping position.

10 Claims, 17 Drawing Figures

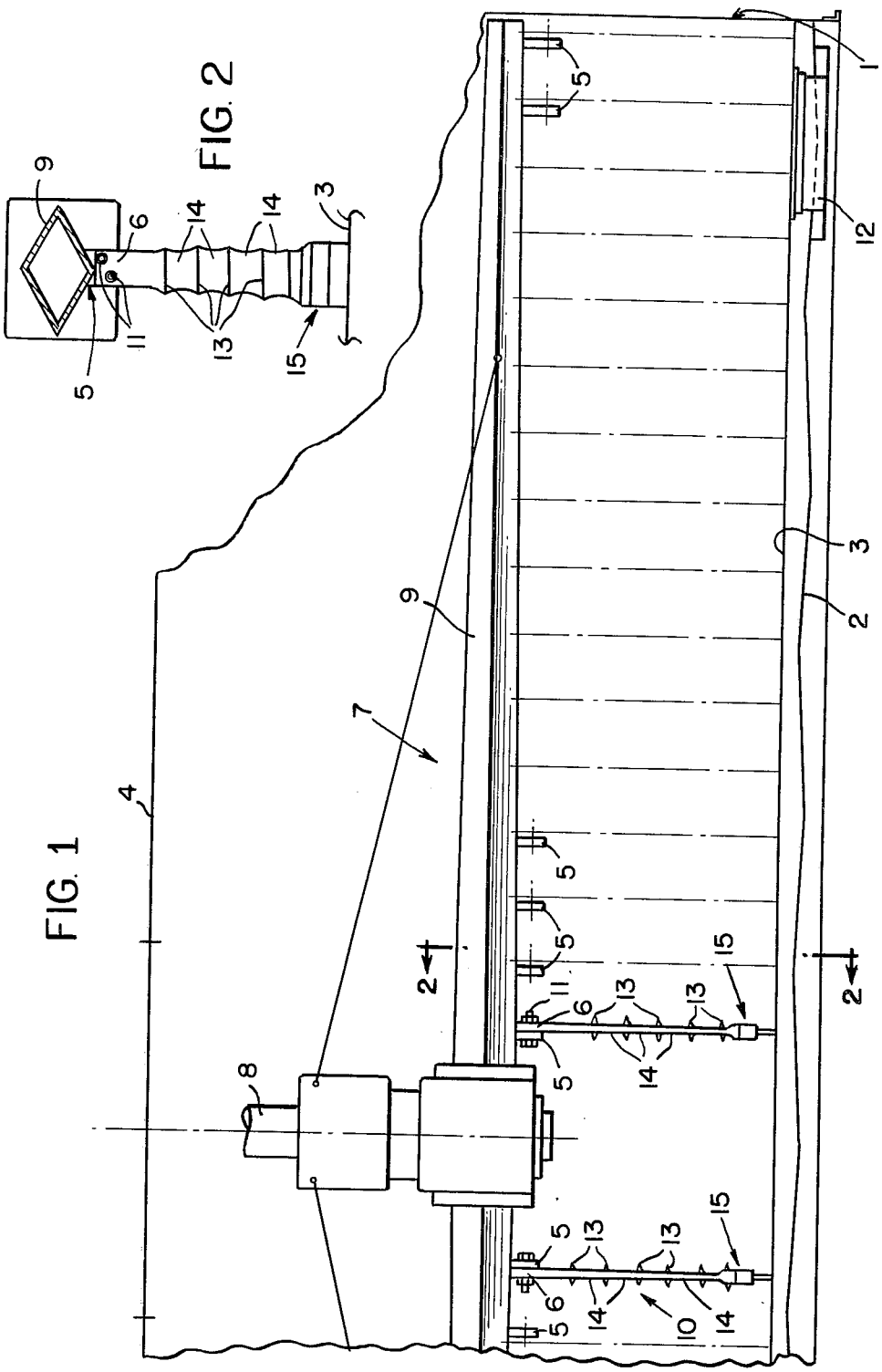

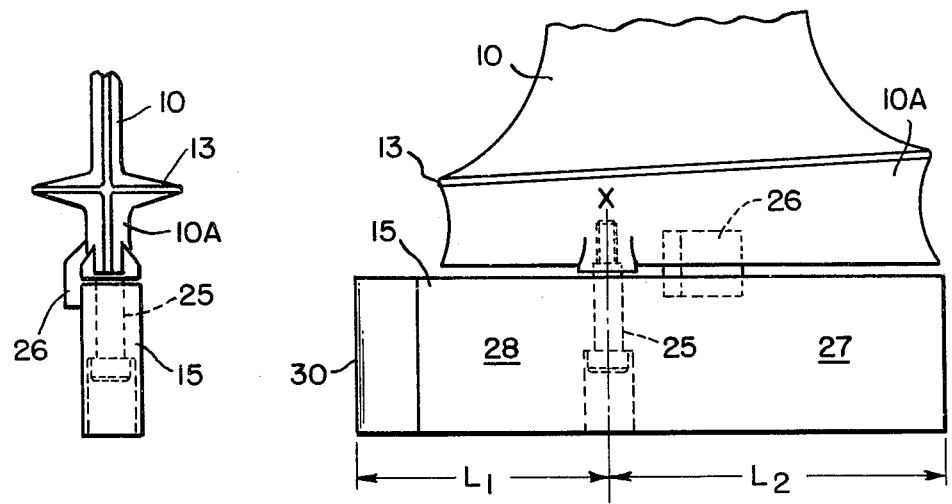
FIG. 5
FIG. 3
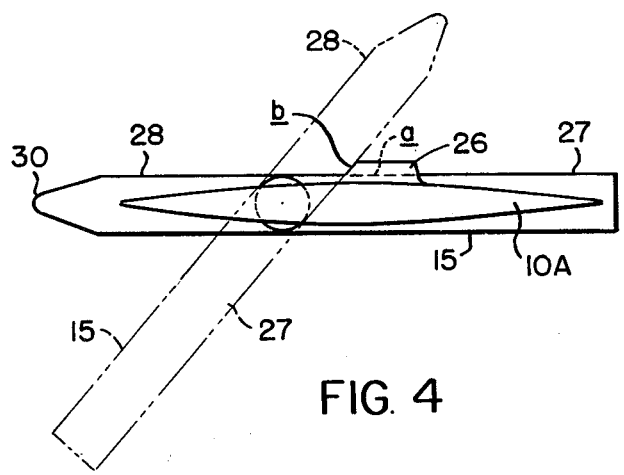
FIG. 4

LAUTERING APPARATUS

BACKGROUND OF THE INVENTION

The present invention relates to a lautering apparatus, and more particularly to means for rotating sweeping blades from a lautering position to a sweeping position and vice versa.

In brewing, filtration or lautering of the grain mash is carried out in apparatus generally referred to as a lauter tun, wort from the tun being delivered to a brewing kettle for subsequent treatment. The lauter tun generally comprises a cylindrical vessel receiving the mash and having a real bottom with a perforated false bottom located a small distance thereabove. A rotary lautering machine is located in the vessel and serves to distribute the mash and to work and loosen the grain bed, the machine comprising an upstanding drive or down hanging top drive including a vertical post carrying radial arms from which subtend vertical blades. In operation the lauter machine is lowered for lautering and is raised and subjected to controlled lowering for a grains removal operation, a series of valve controlled spent grain discharges being located at the floor of the vessel. The blades, pivotally mounted on the arms, comprise a vertical array of streamline fins with a spent grain sweeping portion located at the bottom of each blade. For the lautering operation, the blades are set with the fins and sweeping portion tangential, while for grain removal the blades are pivoted so that the bottom sweeping portion sweep the grains to the discharges on rotation of the machine. In typical known lautering machines, pivoting of the blades is achieved by lever systems, which has the disadvantage of being complicated and expensive. It is the principal object of this invention to obviate or mitigate this disadvantage.

SUMMARY OF THE INVENTION

The lautering apparatus of the present invention includes a vessel for material to be treated and a rotary lautering machine in the vessel having vertical fixed blades and spent grain sweeping feet pivotally mounted on the blades. Actuating means pivot said sweeping feet from a first lautering position to a second sweeping position.

Preferably said actuating means comprise means located on said sweeping feet which are subjected to force reaction with the treated material to pivot the sweeping feet to said first position on rotation of the lautering machine in one direction, and to said sweeping position on rotation of the lautering machine in the reverse direction.

Preferably said actuating means are provided by arranging each foot to have a pivotal axis offset from the centre of area of the foot, whereby each foot is pivoted into said first position or said sweeping positions on appropriate rotation of the machine by virtue of pressure reaction of a portion of the foot with the material in the vessel.

In an alternative arrangement said actuating means comprises an off-set tail carried by each sweeping foot.

Stop means can be provided to limit the pivotal movement of the foot. In one embodiment all of the feet are inclined similarly in each of said first and sweeping positions, but in an alternative embodiment some of the feet are differently orientated in said sweeping position. In particular, some feet can be set for inward sweeping of material while other feet serve for outward sweeping. The position of the discharges influences the particular sweeping arrangement. The sweeping position of each foot can be simply controlled by appropriate positioning of the stop means.

In a preferred embodiment each sweeping foot includes a main upper portion pivotally attached to the fixed vertical blade and a thin plate or skirt subtending from the main portion.

Embodiments of the present invention will now be described by way of example with reference to the accompanying drawings.

DRAWINGS

FIG. 1 shows a side view of a lautering machine installed in a lauter tun embodying the present invention;

FIG. 2 is an end view through section 2—2 in FIG. 1;

FIG. 3 shows a side elevational view of a sweeping foot in the lautering apparatus of FIG. 1.

FIGS. 4 and 5 show plan and end views respectively of the foot of FIG. 3.

DETAILED DESCRIPTION

Figure 8:
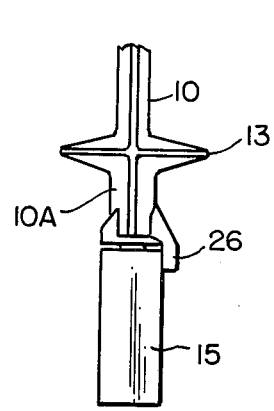
FIGS. 6 to 8 show similar views for a sweeping foot according to a further embodiment of the invention.

Referring to FIGS. 1 and 2, a lauter tun comprises a cylindrical vessel 1 having a real bottom 2 of valley form, and a perforated false bottom 3. The vessel is closed by roof 4 carrying a mash inlet and a vapour outlet (not shown). A rotary lauter machine 7 located in the vessel 1 includes a central down hanging rotary shaft 8 supporting radial arms 9 from which subtend a series of lautering blades 10. The shaft 8 extends through the roof 4 of the vessel, a shaft seal being provided at the roof of the vessel, and is rotatably driven by a suitable drive. Additionally the machine 7 can be raised and lowered.

Each blade 10 carries a vertical series of streamlined fins 13. Each arm 9 carries subtending lugs 5 welded thereto, and a flat portion 6 of each blade 10 is secured to a respective lug 5 by bolts 11. A sweeping foot 15 (FIG. 3) is pivotally attached to a streamlined bottom part 10A of each blade 10 by means of pin 25. 12 is a spent grains outlet.

The pivotal axis X—X of pin 25 is offset from the vertical line through the center of area of the foot 15 (this is the line on either side of which there would be equal force resultants for pressure forces incident normally). Thus, in FIG. 3, $L_2$ is greater than $L_1$. The foot 15 is of rectangular cross section with a tapered nose 30. The blade portion 10A carries a stop 26 having an abutting surface a that engages a tail portion 27 of the foot 15 when the foot is in the tangential lautering position (shown in full line in FIG. 4) and a surface b that engages a nose portion 28 when the foot is pivoted to the sweeping position (shown dashed) in FIG. 4. The feet 15 pivot between the lautering position and the sweeping position on change of direction of the lautering machine. The abutting surface a can be of arcuate form to avoid spent-grain clogging.

Figure 6:
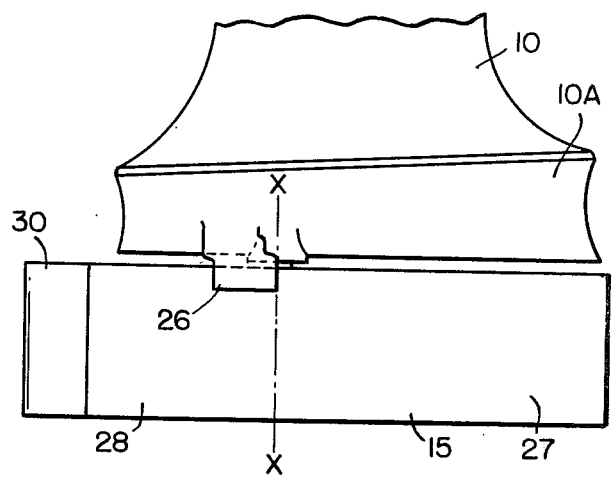
Figure 7:
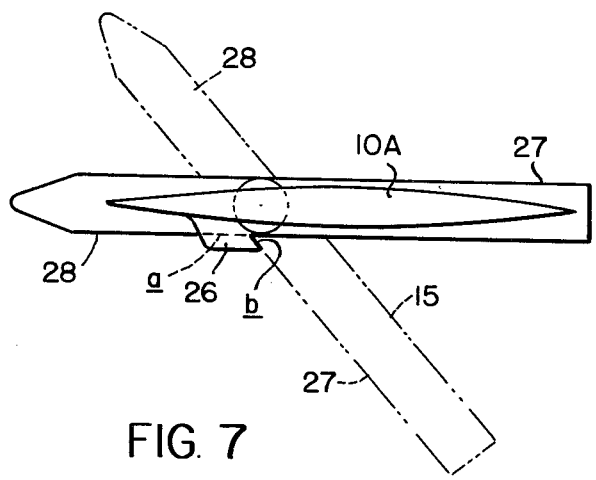
Figure 9:
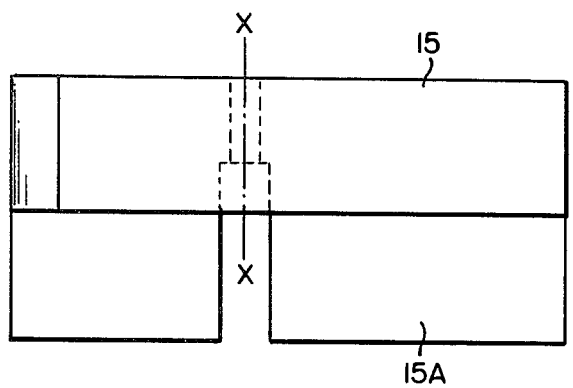
FIGS. 9 to 11 show similar views of an alternative form of foot.
Figure 11:
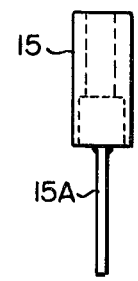
Figure 10:
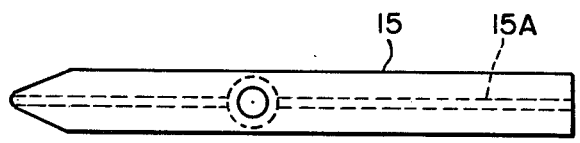
Figures 12, 14:
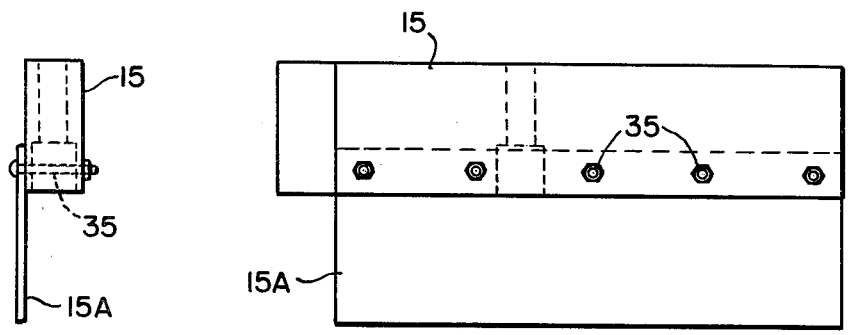
FIGS. 12 to 14 show yet a further alternative foot form.
Figure 13:
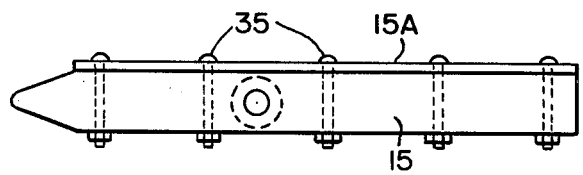

As can be seen in FIG. 4, the foot 15 pivots in a clockwise direction to the sweeping position and the arrangement is such that spent grains are swept radially outwardly to the discharge 12. The embodiment of FIGS. 6 to 8 is generally similar to that of FIGS. 3 to 5, except that the foot in FIGS. 6 to 8 is constrained for limited pivoting such that radially inward grain sweeping is achieved. To this end, the stop 26 is located on the opposite side of the portion 10A and surface a engages tail portion 27 when the foot pivots for grain sweeping. FIGS. 9 and 11 show a modified form of foot having a thin plate or skirt portion 15A. FIGS. 12–14 show yet a further foot embodiment involving skirt portion 15A. In this example the skirt 15A is attached to part 15 by bolts 35.

Figure 15:
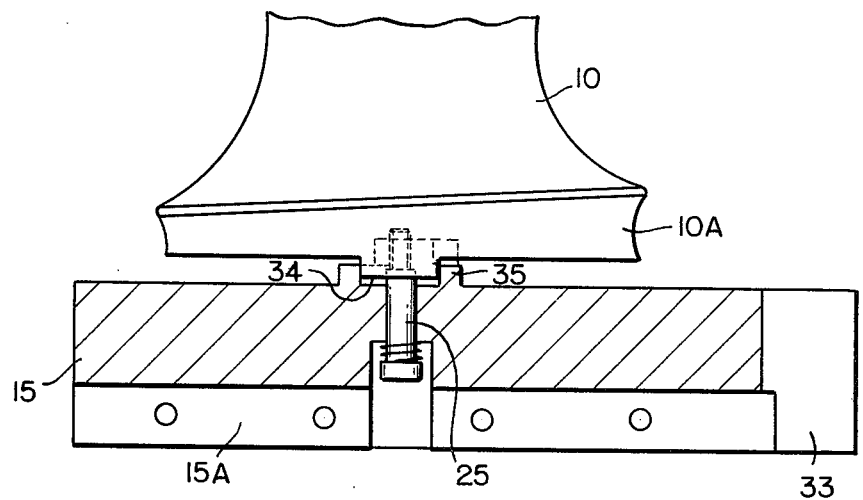
FIG. 15 shows a side view in greater detail of the attachment of the bottom sweeping foot to the lauter blade in FIG. 3, in accordance with another embodiment of the invention.
Figure 16:
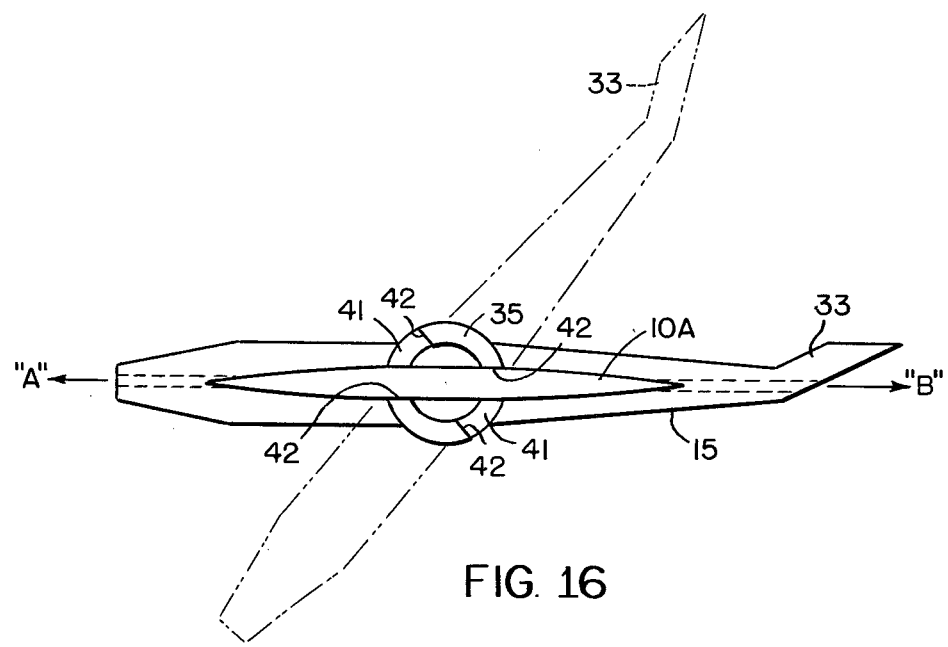
FIG. 16 shows a plan view of the sweeping foot of FIG. 15 set in the lautering position (full line) and in the grain discharge position. (dashed line)

In the further embodiment shown in FIGS. 15 and 16, the sweeping foot is again pivotally attached to blade 10 by a pin 25, but in this case pivoting is achieved by means of the off-set (inclined) tail 33 on the foot. The blade art 10A and the foot 15 both carry circular bosses 34,35. The bosses are machined on their lower and upper faces respectively providing lugs (not shown) and recesses 41 in which the lugs can rotate. The sides 42 of the recesses provide stops for the lugs. The relative position of the lugs and arcuate length and position of the recesses 41 control the positioning of the foot for lautering or inward or outward sweeping. A first lautering position where the foot 15 is aligned with the bottom part 10A of the fixed blade 10 is shown (FIG. 16 full line) and a second grains sweeping position where the foot 15 is angled to the bottom part 10A of the fixed blade 10 is also shown (FIG. 16 dashed line).

When the machine 7 rotates in the direction of arrow "A" (FIG. 16) reaction of the tail 33 with grain material in the vessel causes the foot 15 to pivot into alignment with portion 10A. Rotation in the opposite direction "B" causes the foot 15 to pivot into the sweeping position. The tail 33 can be dimensioned and angled to suit requirements.

The sweeping feet can be of phosphor bronze, steel, plastic or any other suitable material.

In operation, lautering is carried out in the conventional manner, i.e. the bottom of the vessel is filled with hot water to the desired level (underlet), the lauter machine is set at the desired level with the blades in the lautering position and put in motion (direction A), after which the mash is deposited on the vessel. This process ensures that the mash is evenly distributed as it enters the vessel, and that the grain bed is worked and loosened so as to facilitate the formation of a proper filter medium. Ultimately, the lauter machine is stopped, and wort recycling can take place followed by wort discharge to the brew kettle and sparging.

When removal of spent grains is required, the grain discharge valves are opened and the lauter machine is raised to the top position, driven in the reverse direction B, and then subjected to controlled lowering. Due to the off-set nature of the pivotal axis of the sweeping feet 15, (or alternatively by the provision of the off-set fin) the feet 15 on engaging the grain pivot to the sweeping position (FIG. 4) and continued rotation of machine 7 results in the grain being pushed to the spent grains discharges and into a grains removal system.

Appropriate washing down of surfaces will then be effected.

Figure 17:
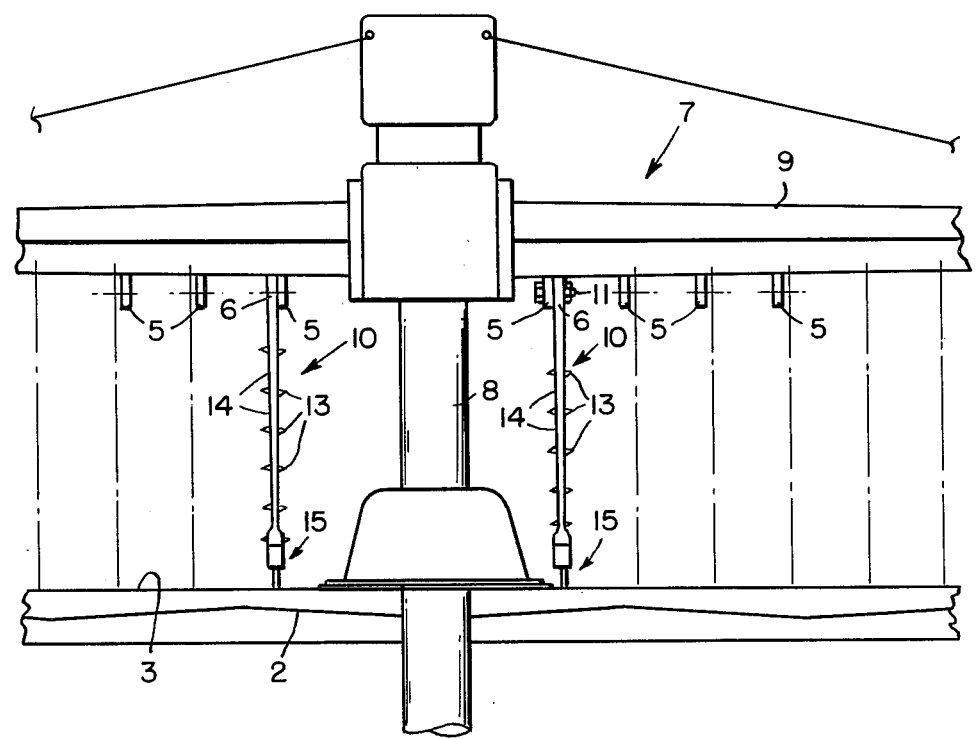
FIG. 17 shows the present invention embodied in a lauter tun having a bottom drive.

In the modification shown in FIG. 17, the lauter machine 7 is arranged for driving via a bottom drive rather than a top drive as in the previous embodiments. Thus in FIG. 17 the shaft 8 extends through the bottom of the tun and is connected to a bottom drive (not shown) thereat. Like parts as in the previous embodiments carry the same reference numerals in FIG. 17.

As will be appreciated the above arrangements provide a simple and inexpensive system for moving the sweeping feet from the lautering position to the grains removal position, and the previous levers systems can be dispensed with. In particular the blades can be fixedly located in the radial arms of the lauter machine, with the sweeping feet pivotally attached to the blades and this provides an improved construction. As those skilled in the art will readily appreciate, various changes may be made in the apparatus and systems described above within the scope of this invention, which is defined by the following claims.

We claim:

1. Lautering apparatus including a vessel for materials to be treated, a rotary lautering machine in the vessel having horizontal arms and a plurality of vertically oriented blades fixed to each arm, wherein the improvement comprises:
    (a) a sweeping foot pivotally mounted to the lower end of each vertically oriented blade, each foot being adapted to pivot with respect to its associated blade about a vertical axis positioned intermediate the ends of each foot;
    (b) actuating means associated with each foot and force reacting with the material in the vessel for pivoting each foot from a first lautering position during rotation of said machine in one direction wherein each foot is aligned with its associated blade, to a second sweeping position during rotation of said machine in a reverse direction wherein each foot extends transverse to its associated blade; and
    (c) cooperating stop means on each foot and its associated blade to limit the pivotal movement of said feet between predetermined lautering and sweeping positions.

2. Lautering apparatus according to claim 1, wherein said actuating means are provided by having the pivotal axis of said foot offset from the centre of area of the blade, whereby the foot is pivoted into said first position or said sweeping position on appropriate rotation of the machine by pressure reaction of a portion of the foot with the material in the vessel.

3. Lautering apparatus according to claim 1, wherein all of the feet are inclined similarly in each of said first and sweeping positions.

4. Lautering apparatus according to claim 1, wherein some of the feet are differently orientated in said sweeping position.

5. Lautering apparatus according to claim 6, wherein some feet when in said sweeping position are set for inward sweeping of material while other feet serve for outward sweeping.

6. Lautering apparatus according to claim 1, wherein the sweeping foot includes a main upper portion pivotally attached to the vertical blade and a thin plate or skirt subtending from the main portion.

7. Lautering apparatus according to claim 1, wherein said actuating means is in the form of an off-set tail carried by the sweeping foot.

8. Lautering apparatus according to claim 1, wherein positioning of said sweeping foot in said first and second positions relative to the blade is achieved by lugs and recesses located between the sweeping foot and the blade and having said clearances to permit relative pivoting between the foot and the blade.

9. Lautering apparatus according to claim 1, wherein the vertical blades are fixed to support portions on radial arms of the lautering machine.

10. Lautering apparatus according to claim 9, wherein the blades are bolted to said support portions.

* * * * *